US012790999B1

(12) United States Patent
Mook et al.

(10) Patent No.: US 12,790,999 B1
(45) Date of Patent: Nov. 10, 2026

(54) RECUPERATOR OF A CLOSED-CYCLE ENGINE

(71) Applicant: Hyliion Holdings Corp, Cedar Park, TX (US)

(72) Inventors: Joshua Tyler Mook, Cincinnati, OH (US); Kevin Michael VandeVoorde, Cincinnati, OH (US); Victor Luis Marrero Ortiz, Humacao, PR (US); Zachary William Nagel, Liberty Township, OH (US)

(73) Assignee: Hyliion Holdings Corp., Cedar Park, TX (US)

( * ) Notice: Subject to any disclaimer, the term of this patent is extended or adjusted under 35 U.S.C. 154(b) by 0 days.

(21) Appl. No.: 19/272,579

(22) Filed: Jul. 17, 2025

(51) Int. Cl.
*F02M 26/30* (2016.01)
*F02M 26/19* (2016.01)
*F02M 26/25* (2016.01)

(52) U.S. Cl.
CPC ............ *F02M 26/30* (2016.02); *F02M 26/19* (2016.02); *F02M 26/25* (2016.02)

(58) Field of Classification Search
CPC ......... F02M 26/30; F02M 26/19; F02M 26/25
USPC .......................... 123/568.12, 568.15, 568.17
See application file for complete search history.

(56) References Cited

U.S. PATENT DOCUMENTS

2009/0241543 A1* 10/2009 Ernst ...................... F01K 13/02 60/645

* cited by examiner

*Primary Examiner* — Hai H Huynh
(74) *Attorney, Agent, or Firm* — Dority & Manning, P.A.

(57) ABSTRACT

A closed-cycle engine may include a heat exchanger channel fluidly coupled with a heat exchanger and configured to receive exhaust gas from the heat exchanger. An intake channel may be configured to receive intake fluid therethrough. A recuperator may be operably coupled with the heat exchanger channel and the intake channel. The recuperator may include a bypass channel, a recuperator portion fluidly separated from the bypass channel, and a separator configured to direct a first portion of the intake fluid into the bypass channel and a second portion of the intake fluid into the recuperator portion. The exhaust gas, the first portion of the intake fluid, and the second portion of the intake fluid may mix within the recuperator to form a combustion gas.

20 Claims, 11 Drawing Sheets

RECUPERATOR OF A CLOSED-CYCLE ENGINE

FIELD OF THE INVENTION

The present disclosure relates generally to vehicles having a closed-cycle engine, and more particularly to a recuperator of a closed-cycle engine.

BACKGROUND OF THE INVENTION

Large, wheeled vehicles pull trailers to transport large volumes of cargo. In some cases, the vehicle and trailer, in combination, may weigh upwards of 140,000 pounds for a tandem-loaded trailer. In a traditional vehicle with an internal combustion engine, the internal combustion engine may be quite large (e.g., up to fifteen liters) to provide enough power to propel the vehicle and the trailer.

Accordingly, large vehicles capable of integrating various power plants, such as a closed-cycle engine, that may allow for alternative power to be used to operate the large vehicle would be welcomed in the technology.

BRIEF DESCRIPTION OF THE DRAWINGS

A full and enabling disclosure of the present disclosure directed to one of ordinary skill in the art, is set forth in the specification, which makes reference to the appended figures, in which.

DETAILED DESCRIPTION OF THE INVENTION

Figure 1:
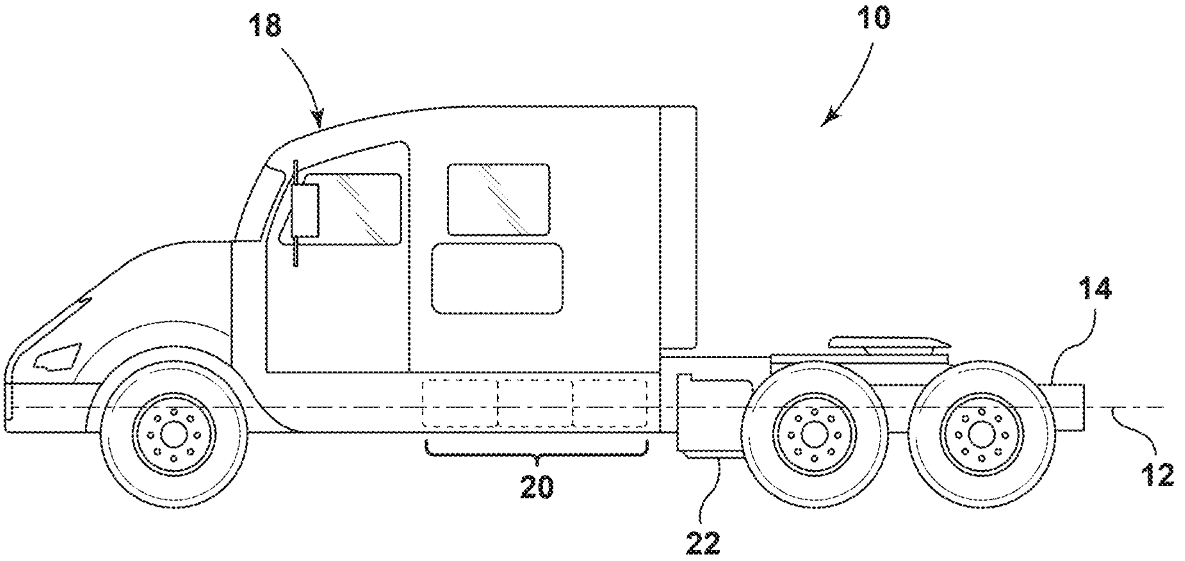
FIG. 1 illustrates a side view of a wheeled vehicle capable of transporting cargo over an extended range in accordance with aspects of the present subject matter.

Reference now will be made in detail to embodiments of the disclosure, one or more examples of which are illustrated in the drawings. Each example is provided by way of explanation of the discourse, not a limitation of the disclosure. In fact, it will be apparent to those skilled in the art that various modifications and variations may be made in the present disclosure without departing from the scope or spirit of the disclosure. For instance, features illustrated or described as part may be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises . . . a” does not, without more constraints, preclude the existence of additional identical elements in the process, method, article, or apparatus that comprises the element.

As used herein, the terms “first,” “second,” and “third” may be used interchangeably to distinguish one component from another and are not intended to signify a location or importance of the individual components. The terms “coupled,” “fixed,” “attached to,” and the like refer to both direct coupling, fixing, or attaching, as well as indirect coupling, fixing, or attaching through one or more intermediate components or features, unless otherwise specified herein. The terms “upstream” and “downstream” refer to the relative direction with respect to a fluid within a fluid circuit. For example, “upstream” refers to the direction from which a fluid flows, and “downstream” refers to the direction to which the fluid moves. The term “selectively” refers to a component’s ability to operate in various states (e.g., an ON state and an OFF state) based on manual and/or automatic control of the component.

Furthermore, any arrangement of components to achieve the same functionality is effectively “associated” such that the functionality is achieved. Hence, any two components herein combined to achieve a particular functionality may be seen as “associated with” each other such that the desired functionality is achieved, irrespective of architectures or intermedial components. Likewise, any two components so associated may also be viewed as being “operably connected” or “operably coupled” to each other to achieve the desired functionality, and any two components capable of being so associated may also be viewed as being “operably couplable” to each other to achieve the desired functionality. Some examples of operably couplable include, but are not limited to, physically mateable, physically interacting components, wirelessly interactable, wirelessly interacting components, logically interacting, and/or logically interactable components.

The singular forms “a,” “an,” and “the” include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items may be employed by itself, or any combination of two or more of the listed items may be employed. For example, if a composition or assembly is described as containing components A, B, and/or C, the composition or assembly may contain A alone; B alone; C alone; A and B in combination; A and C in combination; B and C in combination; or A, B, and C in combination.

In general, the present disclosure is directed to a closed-cycle engine may include a heat exchanger channel fluidly coupled with a heat exchanger and configured to receive exhaust gas from the heat exchanger. An intake channel may be configured to receive intake fluid therethrough, such as ambient/environmental air, oxygen, nitrogen, hydrogen, carbon dioxide, or any other practicable fluid, as well as combinations of these. A recuperator may be operably coupled with the heat exchanger channel and the intake channel. The recuperator may include a bypass channel, a recuperator portion fluidly separated from the bypass channel, and a separator configured to direct a first portion of the intake fluid into the bypass channel and a second portion of the intake fluid into the recuperator portion. The exhaust gas, the first portion of the intake fluid, and the second portion of the intake fluid may mix within the recuperator to form a combustion gas.

In some instances, the recuperator, the heat exchanger channel, the intake channel, a mixing conduit, an exhaust gas recirculation (EGR) ejector, a fuel nozzle, and/or any other component may be at least partially positioned within the housing. In various examples, the housing may additionally or alternatively be referred to as a regenerator, a heater body, a fuel system, and/or any other name based on the components within the housing.

In various examples, at least a portion of the bypass channel may be positioned radially outward of the intake portion and/or the recuperator portion. In some cases, the bypass portion may be configured to provide an insulative characteristic for any component positioned radially inward of the bypass portion, which may assist in reducing heat loss within a housing. Additionally or alternatively, the bypass portion may allow for a temperature of the housing to be maintained below a thermal threshold. By maintaining the housing below the thermal threshold, a coupling section of the housing, which may couple the housing with the engine body, may prevent attachment degradation between the housing and the engine body (and/or the housing and any other component of the closed-loop engine).

Figure 2:
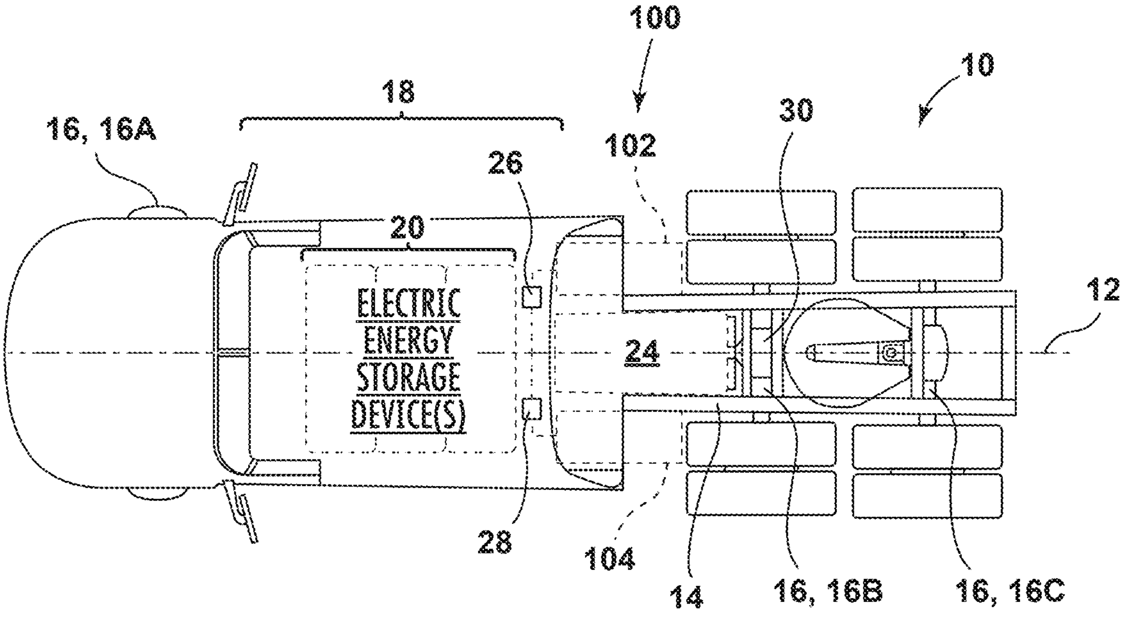
FIG. 2 illustrates a detailed, top view of a wheeled vehicle capable of transporting cargo over an extended range in accordance with aspects of the present subject matter.

Referring now to the drawings, FIGS. 1 and 2 illustrate various views of a wheeled vehicle 10 along a fore/aft axis 12 according to the present disclosure. As shown generally in FIGS. 1 and 2, the vehicle 10 may include a chassis 14, which may support multiple axles 16 and/or a cab 18. The one or more axles 16 may be operably coupled to the chassis 14. In some instances, the one or more axles 16 may include a front axle 16A and a pair of rear axles 16B, 16C.

Additionally, the vehicle 10 may include an engine assembly 100 that may include one or more closed-cycle engines 102, an array of energy storage devices 20 (e.g., batteries), and/or a motor/generator 22 coupled to at least one of the axles 16. Moreover, the vehicle 10 may include one or more fuel tanks 24 operably coupled with the one or more closed-cycle engines 102.

Furthermore, the vehicle 10 may be equipped with one or more power converters 26, 28 coupled to the closed-cycle engines 102 and the array of energy storage devices 20. In some cases, an array of energy storage devices 20 may be positioned in various locations on the vehicle 10. For instance, the energy storage devices 20 may be located between the rails of the chassis 14, under the rails of the chassis 14, around the rails of the chassis 14, and/or in any other practicable location. Moreover, the array of energy storage devices 20 may be connected in series, parallel, and/or some combination. In operation, electric power generated by the motor/generator 22 may be used to charge the array of energy storage devices 20.

With further reference to FIGS. 1 and 2, the motor/generator 22 may be coupled to at least one of the axles 16. For example, in some instances, the motor/generator 22 may be integrated with one of the axles 16 as an e-axle configuration or located in a hub of a wheel coupled to one of the axles 16 as a hub motor/generator configuration. Additionally or alternatively, the motor/generator 22 may be operably coupled to gearboxes or differentials of the vehicle 10. For example, the motor/generator 22 may be coupled to a three-speed centralized gearbox 30 with a two-speed rear differential 38 to provide six discrete gear ratios. In some examples, the vehicle 10 may be configured with a plurality of motors/generators 22, with a respective motor/generator 22 coupled to each wheel or pair of wheels.

While the closed-cycle engines 102 are used to power the vehicle 10 in FIGS. 1 and 2, it will be appreciated that the closed-cycle engines 102 may be used to generate mechanical energy for any other purpose without departing from the scope of the present disclosure.

Figure 3:
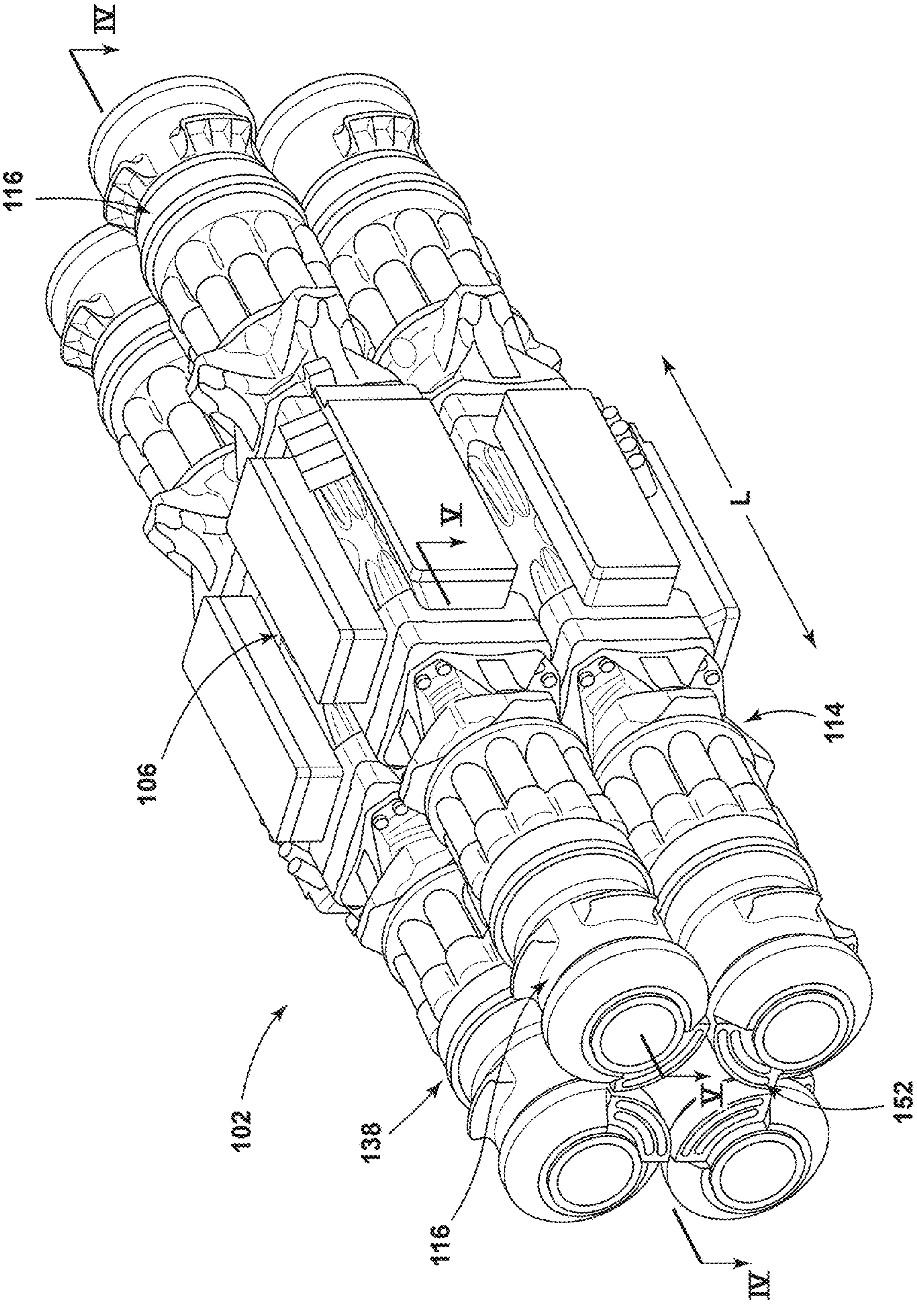
FIG. 3 illustrates a perspective view of a closed-cycle engine for a vehicle in accordance with aspects of the present subject matter.
Figure 4:
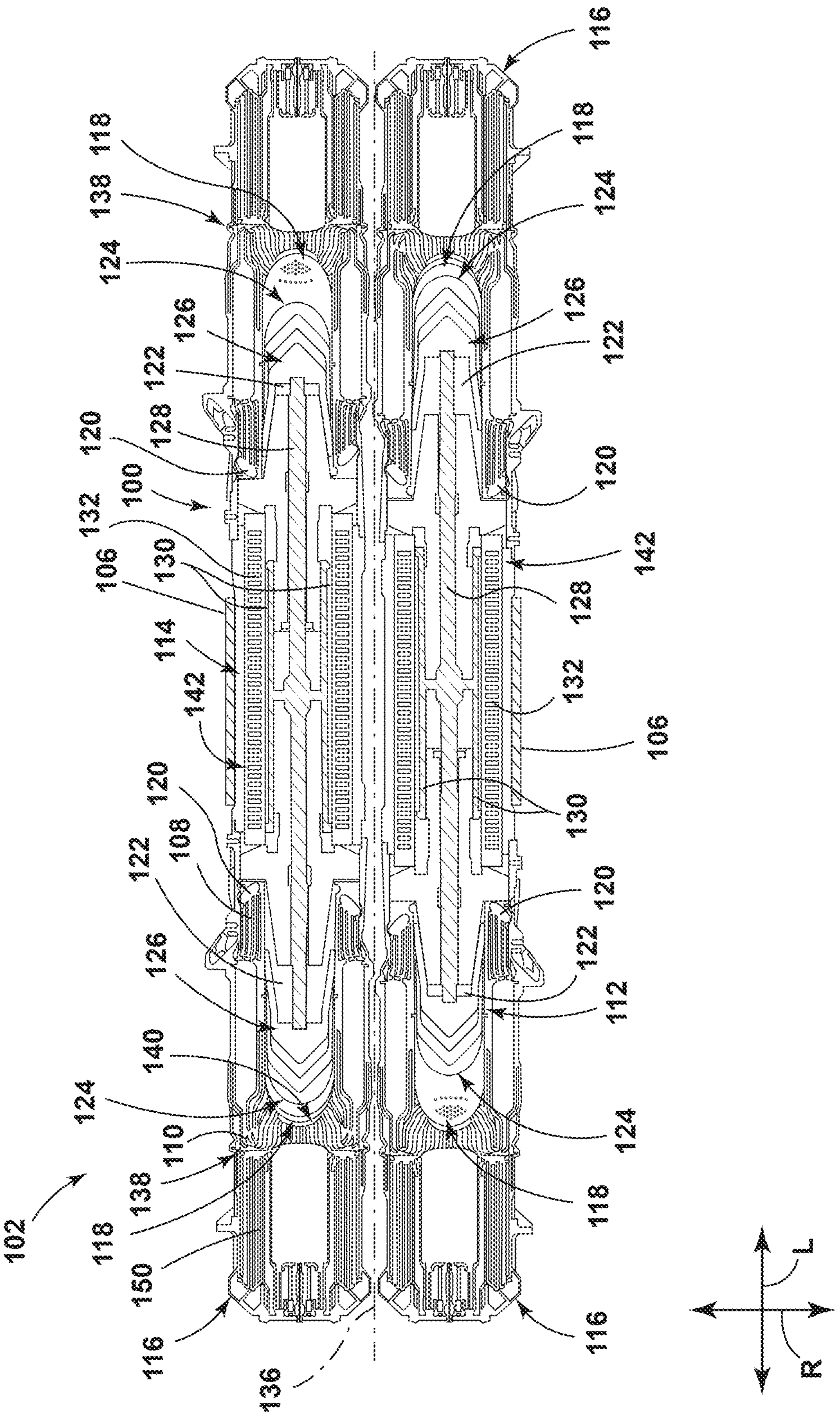
FIG. 4 illustrates a cross-sectional view of one of the closed-cycle engines taken along the line IV-IV of FIG. 3 in accordance with aspects of the present subject matter.
Figure 5:
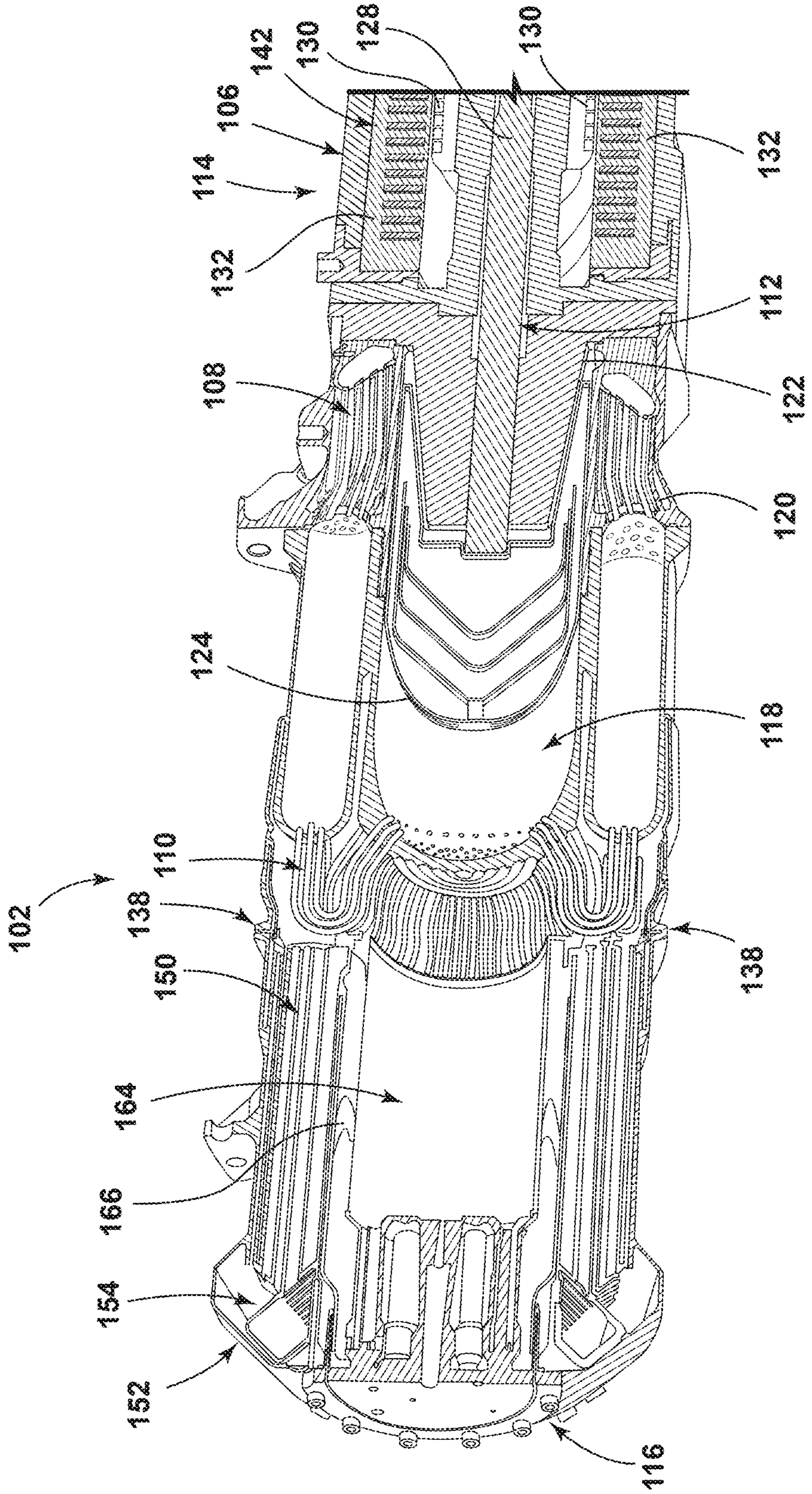
FIG. 5 illustrates a cross-sectional view of one of the closed-cycle engines taken along the line V-V of FIG. 3 in accordance with aspects of the present subject matter.
Figure 6:
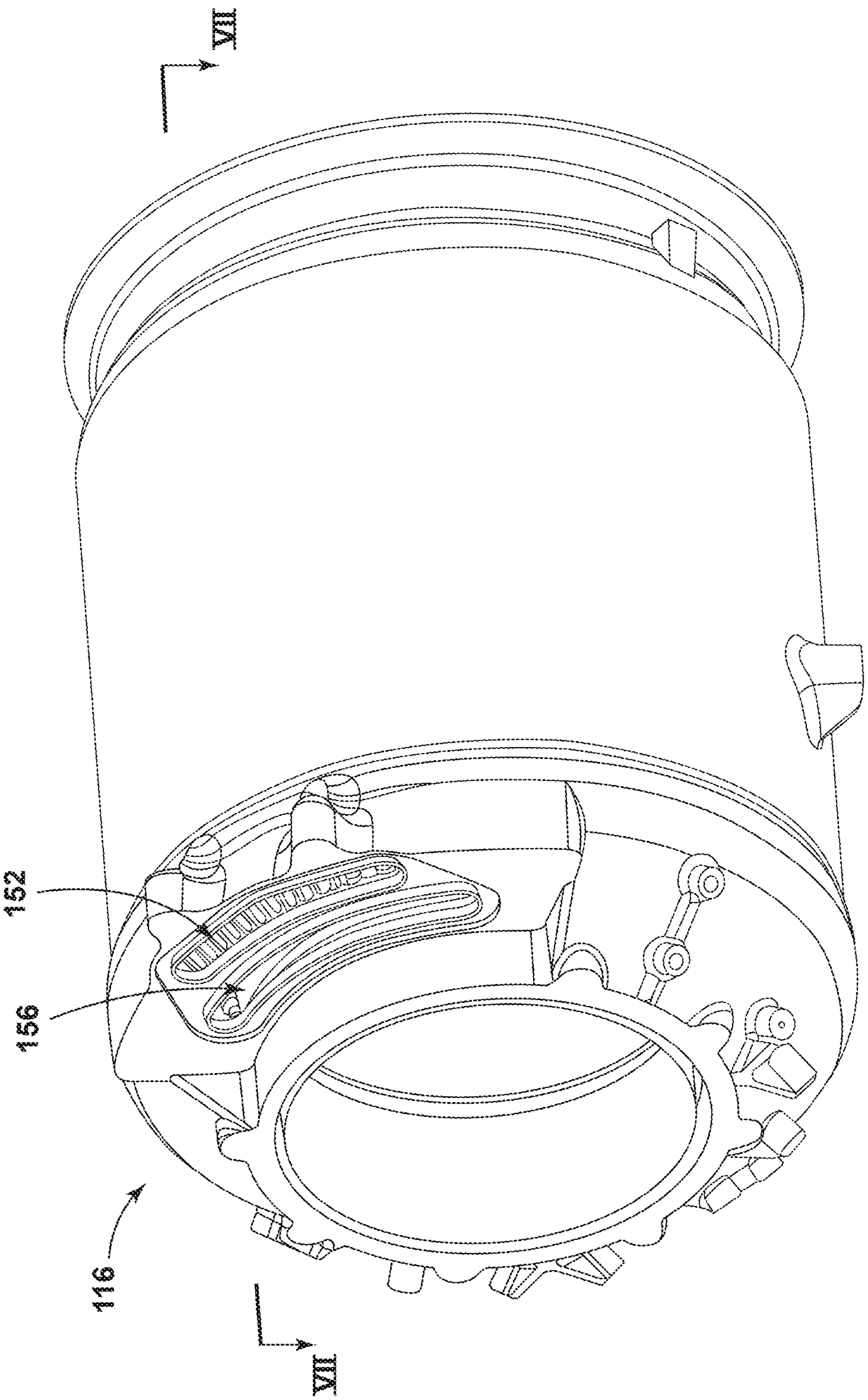
FIG. 6 illustrates a side perspective view of a housing in accordance with aspects of the present subject matter.
Figure 7:
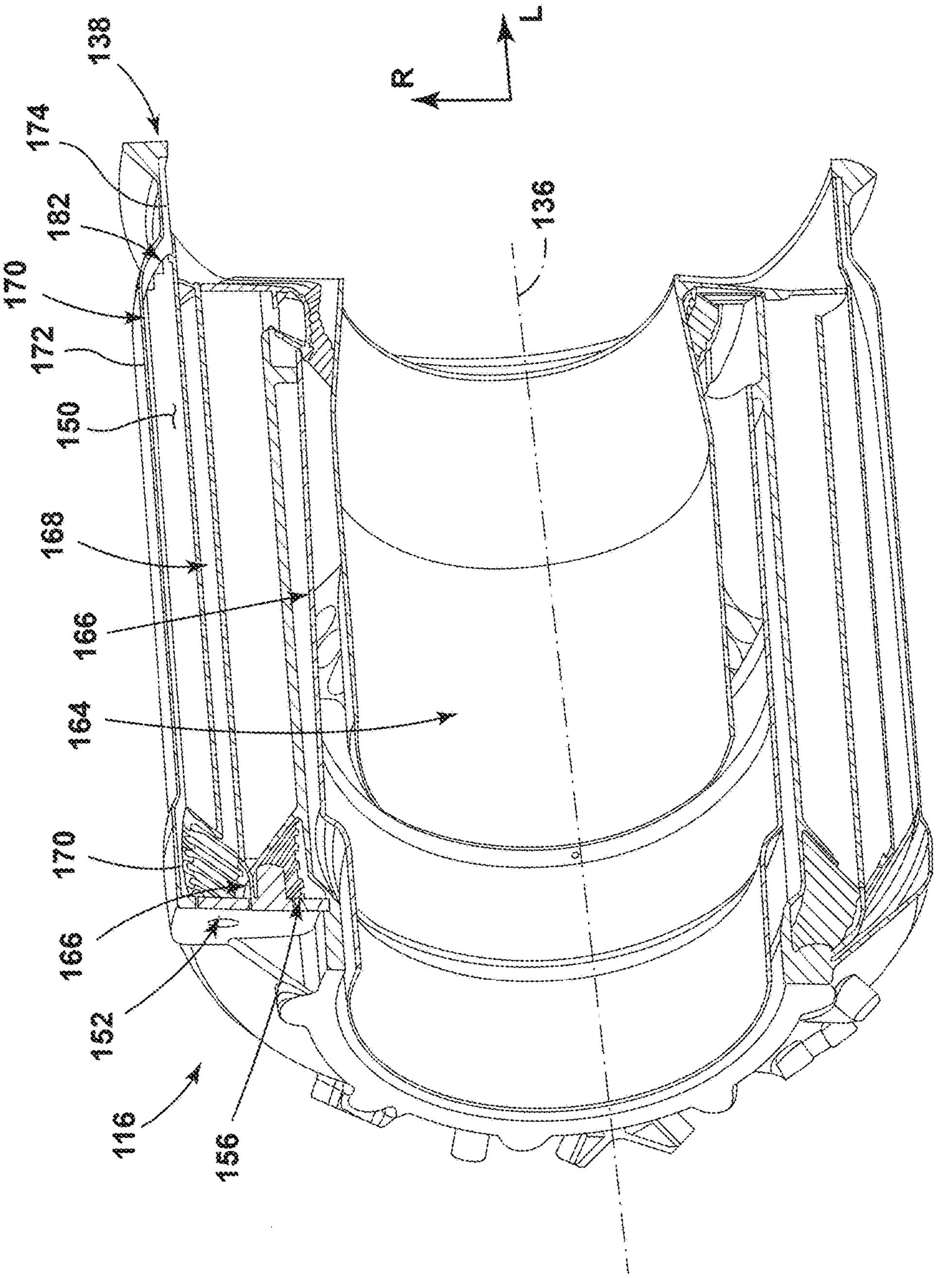
FIG. 7 illustrates a cross-sectional view of one of the closed-cycle engines taken along the line VII-VII of FIG. 6 in accordance with aspects of the present subject matter.
Figure 8:
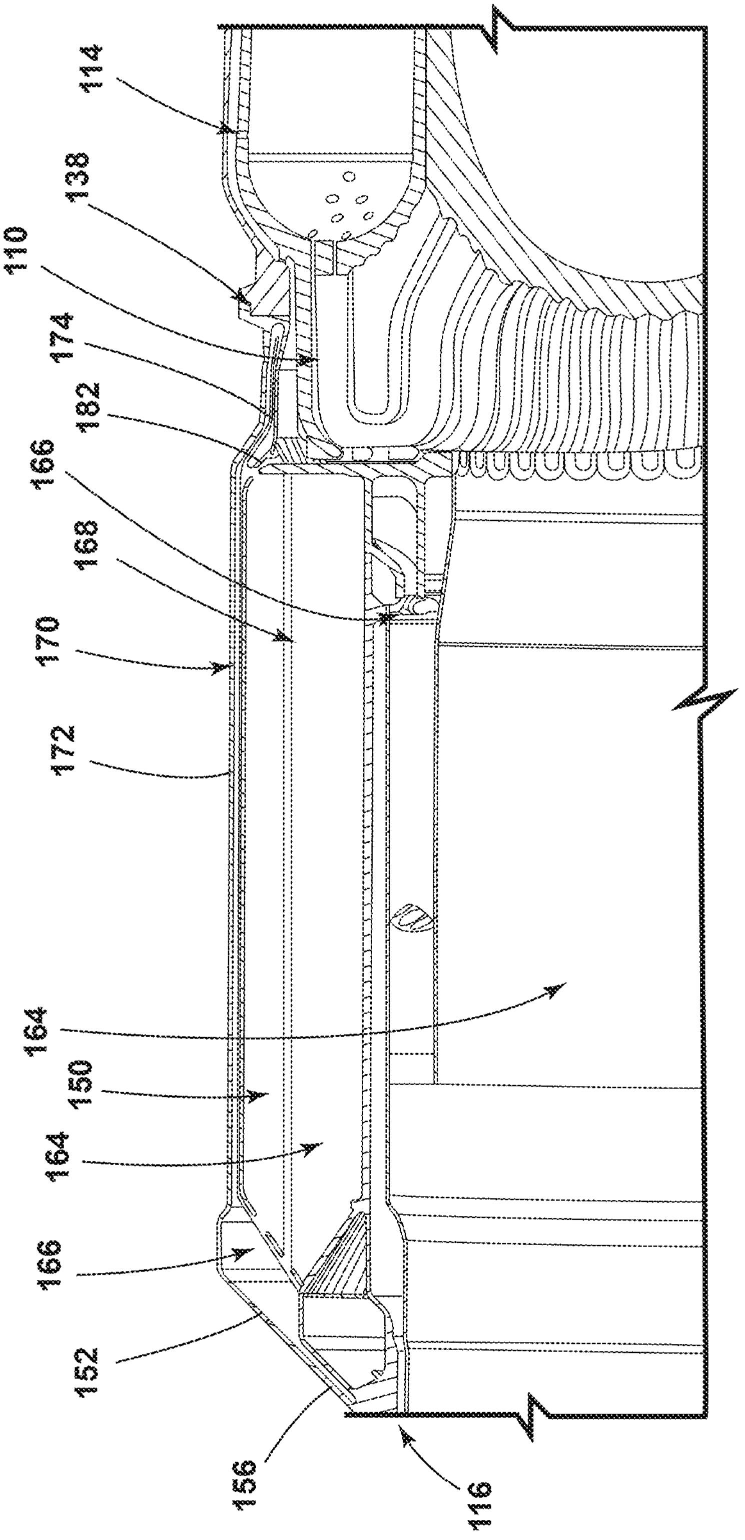
FIG. 8 illustrates a cross-sectional view of one of the closed-cycle engines taken along the line VIII-VIII of FIG. 3 in accordance with aspects of the present subject matter.
Figure 9:
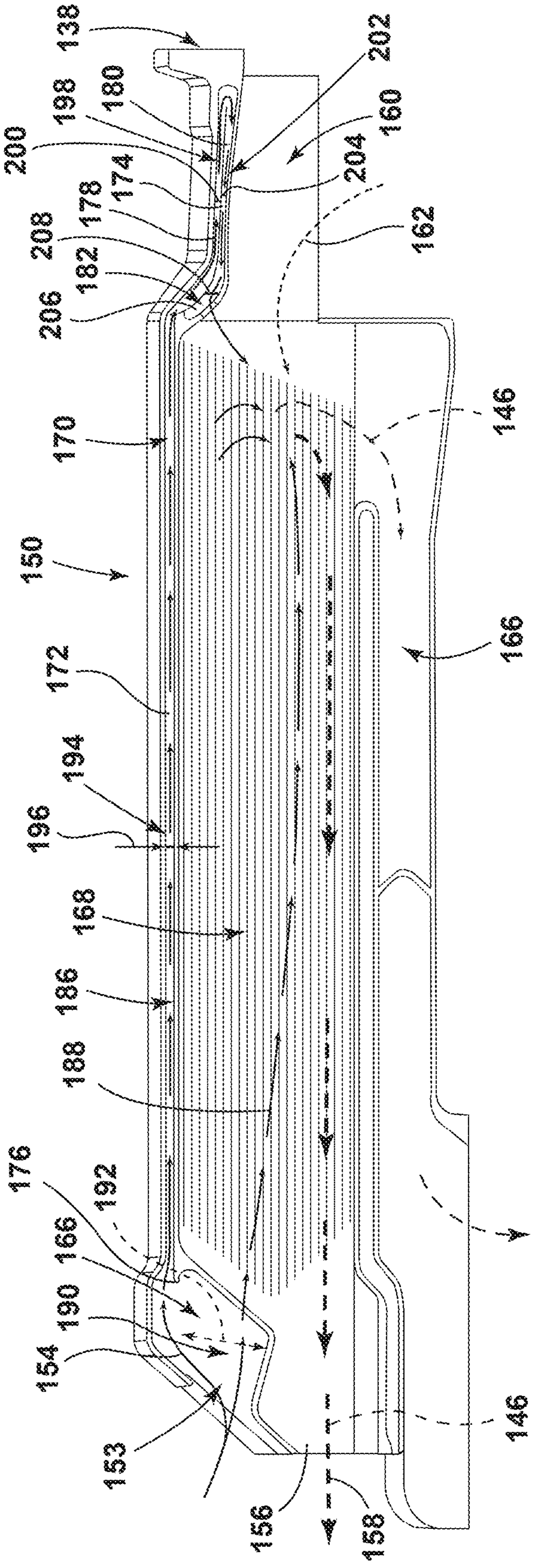
FIG. 9 illustrates a partial side perspective view of a recuperator in accordance with aspects of the present subject matter.
Figure 10:
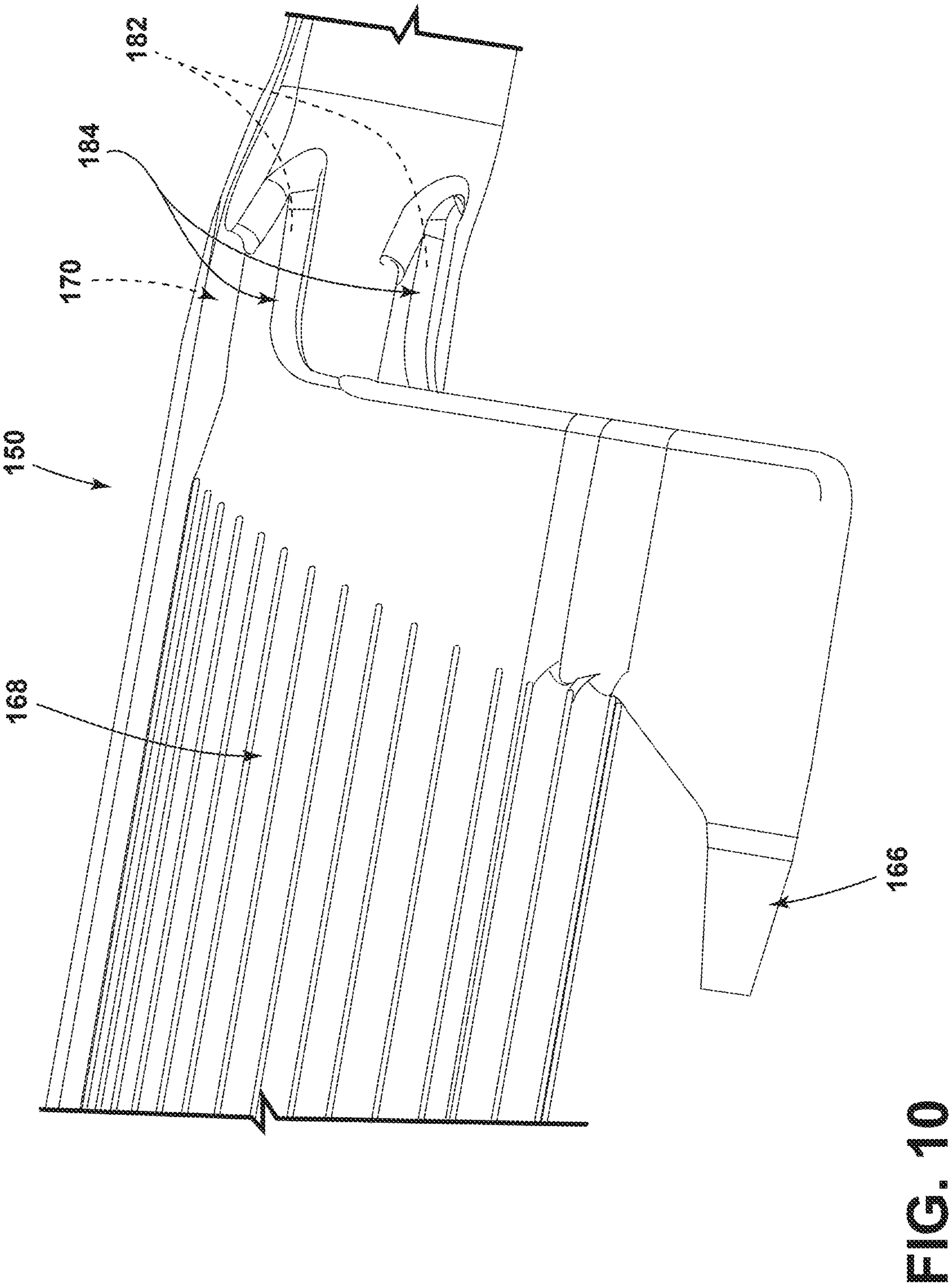
FIG. 10 illustrates a partial bottom perspective view of the recuperator in accordance with aspects of the present subject matter.

Referring now to FIGS. 3-5, the closed-cycle engines 102 capable of being operably coupled to a load device 106 are illustrated according to various aspects of the present disclosure. The closed-cycle engine 102 may contain an engine working fluid to which and from which thermal energy is exchanged at a respective cold side heat exchanger 108 and a hot side heat exchanger 110. In various instances, any suitable engine working fluid may be utilized in accordance with the present disclosure. In various cases, the working fluids may be inert, such that they generally do not participate in chemical reactions such as oxidation within the environment of the closed-cycle engine 102. For example, the engine working fluid may include a gas, such as a noble gas as the engine working fluid. Various noble gasses that may be utilized by the closed-cycle engine 102 may include monoatomic gases, such as helium, neon, argon, krypton, or xenon, as well as combinations of these. In several examples, the engine working fluid may include air, oxygen, nitrogen, hydrogen, carbon dioxide, or any other practicable fluid, as well as combinations of these. In still various instances, the engine working fluid may be liquid fluids of one or more elements described herein, or combinations thereof. It will be appreciated that various examples of the engine working fluid may include particles or other substances as appropriate for the engine working fluid.

In various cases, the load device 106 may be a mechanical work device and/or an electric machine. For example, the load device 106 may be a pump, compressor, or other work device. Additionally or alternatively, the load device 106 may be an electric machine that is configured as a generator to produce electric energy from the movement of a piston assembly 112 of the closed-cycle engine 102. In still another example, the electric machine may be configured as a motor that may provide motive force to move or actuate the piston assembly 112, such as to provide initial movement (e.g., a starter motor). In still various examples, the electric machine may be configured as a motor and generator or another electric machine.

As illustrated in FIGS. 3-5, the closed-cycle engine 102 may include an engine body 114 and a pair of housings 116 disposed on opposing sides of the engine body 114. For example, a first housing 116 may be disposed at a first side portion of the engine body 114 and a second housing 116 may be disposed at a second side portion of the engine body 114. In still other examples, a plurality of engine bodies 114 may be provided, and/or a single housing 116 or a multitude of housings 116 may be provided.

In various embodiments, as shown in FIG. 4, the hot side heat exchanger 110 may output thermal energy to the engine working fluid at an expansion chamber 118 of the closed-cycle engine 102. The hot side heat exchanger 110 may be positioned proximate to the expansion chamber 118 of the engine in thermal communication with the housing 116. In other examples, the hot side heat exchanger 110 may be separate from the housing 116, such that the heating working fluid is provided in thermal communication, or additionally, in fluid communication with the hot side heat exchanger 110. In some cases, the hot side heat exchanger 110 may be positioned in thermal communication with the housing 116 and the expansion chamber 118 of the engine 102 such as to receive thermal energy from the housing 116 and provide thermal energy to the engine working fluid within the closed-cycle engine 102.

In still various examples, the housing 116 may include a single thermal energy output source to a single expansion chamber 118 of the engine. As such, the closed-cycle engine 102 may include a plurality of heater assemblies each providing thermal energy to the engine working fluid at each expansion chamber 118. In other embodiments, such as depicted in regard to FIG. 4, the housing 116 may provide thermal energy to a plurality of expansion chambers 118 of the closed-cycle engine 102.

The closed-cycle engine 102 may further include a chiller assembly 120. The chiller assembly 120 may be configured to receive and displace thermal energy from a compression chamber 122 of the closed-cycle engine 102. Additionally, the cold side heat exchanger 108 may be thermally coupled to the compression chamber 122 of the closed cycle engine 102, and the chiller assembly 120. In some instances, the cold side heat exchanger 108 and a piston chamber 126 defining the compression chamber 122 of the closed-cycle engine 102 may together be defined as an integral, unitary structure. In still various examples, the cold side heat exchanger 108, at least a portion of the piston chamber 126 defining the compression chamber 122, and at least a portion of the chiller assembly 120 may together define an integral, unitary structure.

In various embodiments, as shown in FIG. 4, the chiller assembly 120 may be a bottoming cycle to the closed-cycle engine 102. As such, the chiller assembly 120 may be configured to receive thermal energy from the closed-cycle engine 102. The thermal energy received at the chiller assembly 120, such as through a cold side heat exchanger 108, may be added to a chiller working fluid at the chiller assembly 120. In various examples, the chiller assembly 120 defines a Rankine cycle system through which the chiller working fluid flows in a closed loop arrangement with a compressor. In some examples, the chiller working fluid may be in a closed-loop arrangement with an expander. In various cases, the cold side heat exchanger 108 may include a condenser or radiator. The cold side heat exchanger 108 may be positioned downstream of the compressor and upstream of the expander and in thermal communication with the compression chamber 122 of the closed-cycle engine 102. In various embodiments, the cold side heat exchanger 108 may generally define an evaporator receiving thermal energy from the closed-cycle engine 102.

Referring still to FIG. 4, each piston assembly 112 may be positioned within a volume or piston chamber 126. The volume within the piston chamber 126 is separated into a first chamber, or hot chamber, or expansion chamber 118 and a second chamber, or cold chamber (relative to the hot chamber), or compression chamber 122 by a piston 124 of the piston assembly 112. The expansion chamber 118 may be positioned thermally proximally to the housing 116 relative to the compression chamber 122 thermally distal to the housing 116. The compression chamber 122 may be positioned thermally proximal to the chiller assembly 120 relative to the expansion chamber 118 thermally distal to the chiller assembly 120.

In various instances, the piston assembly 112 may be configured as a double-ended piston assembly 112 in which a pair of pistons 124 is each coupled to a connection member 128. The connection member 128 may generally define a rigid shaft or rod extended along a direction of motion of the piston assembly 112. In other instances, the connection members 128 may include one or more springs or spring assemblies, such as further provided herein, providing flexible or non-rigid movement of the connection member 128. In still other instances, the connection member 128 may further define substantially U-shaped connections or V-shaped connections between the pair of pistons 124.

Each piston 124 may be positioned within the piston chamber 126 such as to define the expansion chamber 118 and the compression chamber 122 within the volume of the piston chamber 126. In operation, combustion may occur within a first combustion chamber 118 housing the first piston 124 causing the first piston 124, the connection member 128, and the second piston 124 to move from a first position to a second position in a lateral L direction. In turn, combustion may occur within a second combustion chamber 118 housing the second piston 124 causing the first piston 124, the connection member 128, and the second piston 124 to move from the second position to the first position. The load device 106 may be operably coupled to the piston assembly 112 such as to extract energy therefrom, provide energy thereto, or both. The load device 106 may define an electric machine that is in magnetic communication with the closed-cycle engine 102 via the connection member 128. In various examples, the piston assembly 112 may include a load member 130 positioned in operable communication with a stator assembly 132 of the electric machine. The stator assembly 132 may generally include a magnet array and a plurality of windings wrapped circumferentially relative to the piston assembly 112 and extended along a lateral direction L. In some instances, such as depicted in regard to FIG. 4, the load member 130 is connected to the connection member 128. In some examples, the linear motion of the load member 130 in conjunction with the piston assembly 112 may generate electricity via the magnetic communication between the stator assembly 132 and the load member 130.

Referring still to FIG. 4, in various embodiments, the hot side heat exchanger 110 may further define at least a portion of the expansion chamber 118. In some cases, the hot side heat exchanger 110 defines a unitary or monolithic structure with at least a portion of the piston chamber 126, such as to define at least a portion of the expansion chamber 118. In some embodiments, the housing 116 may further define at least a portion of the hot side heat exchanger 110, such as to define a unitary or monolithic structure with the hot side heat exchanger 110.

Furthermore, as shown in FIGS. 3-5, the piston chamber 126 may define a dome structure 140 within the expansion chamber 118. The expansion chamber dome structure 140 may provide reduced surface area heat losses across the outer end segment of the expansion chamber 118. In various instances, the pistons 124 of the piston assembly 112 may also include domed pistons 124 corresponding to the expansion chamber dome structure 140. The dome structure 140, the domed piston 124, or both may provide higher compression ratios at the chambers 122, such as to improve power density and output.

Various examples of the closed-cycle engine 102 may include control systems and methods of controlling various sub-systems disclosed herein, such as, but not limited to, the fuel source, the oxidizer source, the cooling fluid source, the housing 116, the chiller assembly 120, and the load device 106, including any flow rates, pressures, temperatures, loads, discharges, frequencies, amplitudes, or other suitable control properties associated with the closed-cycle engine 102.

In some examples, the control system may control the closed-cycle engine 102 to generate a temperature differential, such as a temperature differential at the engine working fluid relative to the heating working fluid and the chiller working fluid. Thus, the closed-cycle engine 102 defines a hot side, such as at the expansion chamber 118, and a cold side, such as at the compression chamber 122. The temperature differential causes free piston assemblies 112 to move within their respective piston chambers defined at respective piston chambers 126. The movement of pistons 124 within the respective piston chambers 126 causes the electric machine to generate electrical power. The generated electrical power may be provided to the energy storage devices 20. The control system may monitor one or more operating conditions associated with the closed-cycle engine 102, such as piston movement (e.g., amplitude and position), as well as one or more operating conditions associated with the electric machine, such as voltage or electric current. Based on such conditions, the control system generates control commands that are provided to one or more controllable devices of the closed-cycle engine 102. The controllable devices execute control actions in accordance with the control commands.

In various examples, such as the one shown in FIG. 4, the load device 106 may include a machine body 142 positioned laterally between the piston chambers 126. The machine body 142 surrounds and houses the stator assembly 132 of the load device 106 defining the electric machine. The machine body 142 may further surround the load member 130 of the electric machine attached to the connection member 128 of the piston assembly 112.

Referring now to FIGS. 3-11, in some examples the closed-cycle engine 102 may include the engine body 114 and the pair of housings 116 disposed on opposing sides of the engine body 114, one of which is illustrated in FIG. 5. In various examples, the housing 116 may include a recuperator 150. The recuperator 150 may include or be operably coupled with an intake fluid channel 152 that defines an intake fluid pathway 154, a discharge channel 156 that defines a discharge pathway 158, and/or a heat exchanger channel 160 that defines an exhaust gas pathway 162 from the heat exchanger 110 to the recuperator 150.

In some instances, the intake fluid channel 152 may define at least a portion of an intake fluid pathway 154 that provides intake fluid to the recuperator 150. In some cases, the intake fluid may be pressurized, such as via a compressor, to induce a flow of intake fluid into the intake fluid pathway 154. The heat exchanger channel 160 may provide exhaust gas from the heat exchanger 110 to the recuperator 150. In turn, the intake fluid and the exhaust gas mix and provide a first portion of a fresh combustion gas 146 to the mixing conduit 164 via an exhaust gas recirculation (EGR) ejector 166. The first portion of the fresh combustion gas 146 may be directed into an expansion chamber 118 while a fuel nozzle introduces a flow of fuel, which may include a liquid, gaseous fuel. A second portion of the fresh combustion gas may be directed to the discharge channel 156, which is then discharged from the housing 116 along the discharge pathway 158.

In the expansion chamber 118, the fuel combines with the first portion of the fresh combustion gas and is ignited, for example, by a glow plug or a spark plug. The expansion chamber 118 may provide a vortex combustion pattern with a circular flow. The centripetal force of the vortex combustion pattern may draw the combustion flame radially or concentrically inward while propelling unburnt combustion gas radially or concentrically outward. The exhaust gas may be exhausted from the expansion chamber 118 and into the hot-side heat exchanger 110. The exhaust gas may flow from the hot-side heat exchanger 110 to the recuperator 150 to become the exhaust gas that may then be provided to the recuperator 150.

Referring now to FIGS. 5-11, the recuperator 150, according to various aspects of the present disclosure, may include an intake portion that may define at least a portion of the intake fluid pathway 154 and a recuperator portion 168 that may define at least a portion of a discharge pathway 158. In some cases, the recuperator 150 may also include a bypass portion 170 that may include a bypass channel 172. In such instances, a first portion 186 of the intake fluid may be directed through the bypass portion 170 and a second portion 188 of the intake fluid may be directed through the recuperator portion 168.

In various examples, at least a portion of the bypass channel 172 may be positioned radially R outward of the intake portion in the radial direction and/or the recuperator portion 168. In some cases, the bypass portion 170 may be configured to provide an insulative characteristic for any component positioned radially R inward of the bypass portion 170, which may assist in reducing heat loss within the housing 116. Additionally or alternatively, the bypass portion 170 may allow for a temperature of the housing 116 (or sections thereof) to be maintained below a thermal threshold. By maintaining the housing 116 below the thermal threshold, a coupling section 138 of the housing 116, which may couple the housing 116 with the engine body 114, may prevent attachment degradation between the housing 116 and the engine body 114 (and/or the housing 116 and any other component of the closed-loop engine 102).

In various examples, a separator 176 may be configured to divide the intake fluid pathway 154 into the recuperator portion 168 and the bypass portion 170. In such instances, a first portion 186 of the intake fluid may be directed into the bypass portion 170 and a second portion 188 of the intake fluid may be directed into the recuperator portion 168. In some cases, a first volume of the first portion 186 of intake fluid is less than a second volume of the second portion 188 of intake fluid. In various examples, the bypass channel 172 may include one or more passages that may be separate from one another downstream of the separator 176 and/or fluidly communicable with one another downstream of the separator 176. As illustrated, the bypass channel 172 may extend laterally inward of the recuperator portion 168 in the lateral L direction.

In some instances, the bypass channel 172 may also include a guide 174 that may be disposed proximately to an opposing lateral side portion of the bypass channel 172 from the separator 176. The guide 174 may be configured to redirect the intake fluid within the bypass channel 172 from a laterally inward direction, as indicated by 178, to a laterally outward direction, as indicated by 180.

The channel may also define a bypass outlet 182. The intake fluid may exit the bypass channel 172 through the bypass outlet 182 once downstream of the guide 174. In some cases, the bypass outlet 182 may include one or more bypass nozzles 184. Additionally, the bypass outlet 182 may be proximate (and possibly upstream) to a discharge channel outlet. As such, the exhaust gas from the heat exchanger 110 and the first portion 186 of the intake fluid may be combined with one another.

As provided herein, the heat exchanger channel 160 may provide exhaust gas from the heat exchanger 110 to the recuperator portion 168. The recuperator portion 168 may also receive the first portion 186 of the intake fluid from the bypass channel 172 and/or the second portion 188 of the intake fluid through the recuperator portion 168. In turn, the first portion 186 of the intake fluid, the second portion 188 of the intake fluid, and/or the exhaust gas mix and provide a first portion of a fresh combustion gas 146 to the mixing conduit 164 via an exhaust gas recirculation (EGR) ejector 166. The first portion of the exhaust gas may then be directed into the expansion chamber 118 while a fuel nozzle introduces a flow of fuel, which may include a liquid or gaseous fuel. A second portion of the fresh exhaust gas may be directed to the discharge channel 156, which is then exhausted from the housing 116.

As illustrated, a first segment 190 of the bypass channel 172 may have a varied thickness 192 relative to an axis 136 of the housing 116. A second segment 194 may be downstream of the first segment 190. The second segment 194 may have a second segment radial thickness 196 that is less than the radial thickness of any portion of the first segment 190. A third segment 198 may be downstream of the second segment 194 and may have a third segment radial thickness 200 that is less than the second segment radial thickness 196. A fourth segment 202 of the bypass channel 172 may be downstream of the third segment 198. In some instances, a direction of the first portion 186 of the intake fluid within the fourth segment 202 may be at least partially opposite to the direction of the first portion 186 of the intake fluid within the third segment 198. The fourth segment 202 may have a fourth segment radial thickness 204 that is less than the second segment radial thickness 196. A fifth segment 206 of the bypass channel 172 may be downstream of the fourth segment 202. A fifth segment radial thickness 208 may be varied and include at least a portion that is greater than the third segment radial thickness 200 and/or the fourth segment radial thickness 204.

Additionally, in some cases, the first segment 190 may be positioned a first radial distance from an axis 136 of the housing 116 and the second segment 194 may be positioned a second radial distance from an axis 136 of the housing 116. The second radial distance may be varied from the first radial distance. For instance, as shown in the examples of FIGS. 5-11, the second radial distance may be less than the first radial distance. However, it will be appreciated that the second radial distance may be greater than the first radial distance and/or equal to the first radial distance without departing from the scope of the present disclosure. Additionally or alternatively, the third segment 198 may be positioned a third radial distance from an axis 136 of the housing 116 and the fourth segment 202 may be positioned a fourth radial distance from an axis 136 of the housing 116. The fourth radial distance may be varied from the third radial distance. For instance, as shown in the examples of FIGS. 5-11, the fourth radial distance may be less than the third radial distance. However, it will be appreciated that the fourth radial distance may be greater than the third radial distance and/or equal to the third radial distance without departing from the scope of the present disclosure.

In various examples, the bypass channel 172 extends laterally inward of the EGR ejector 166. In such instances, a temperature of the intake fluid within the bypass channel 172 may be less than a temperature of the combustion gas 146 exhausted from the EGR ejector 166. Additionally or alternatively, the bypass channel 172 may be positioned radially R outward of the EGR ejector 166. In such instances, a temperature of the intake fluid within the bypass channel 172 may be less than a temperature of the combustion gas 146 exhausted from the EGR ejector 166. In various instances, an outboard temperature of a laterally outboard section of the recuperator 150 may be within twenty-five (25) times (or any other practicable factor) of an inboard temperature of a laterally inboard section of the recuperator 150.

Figure 11:
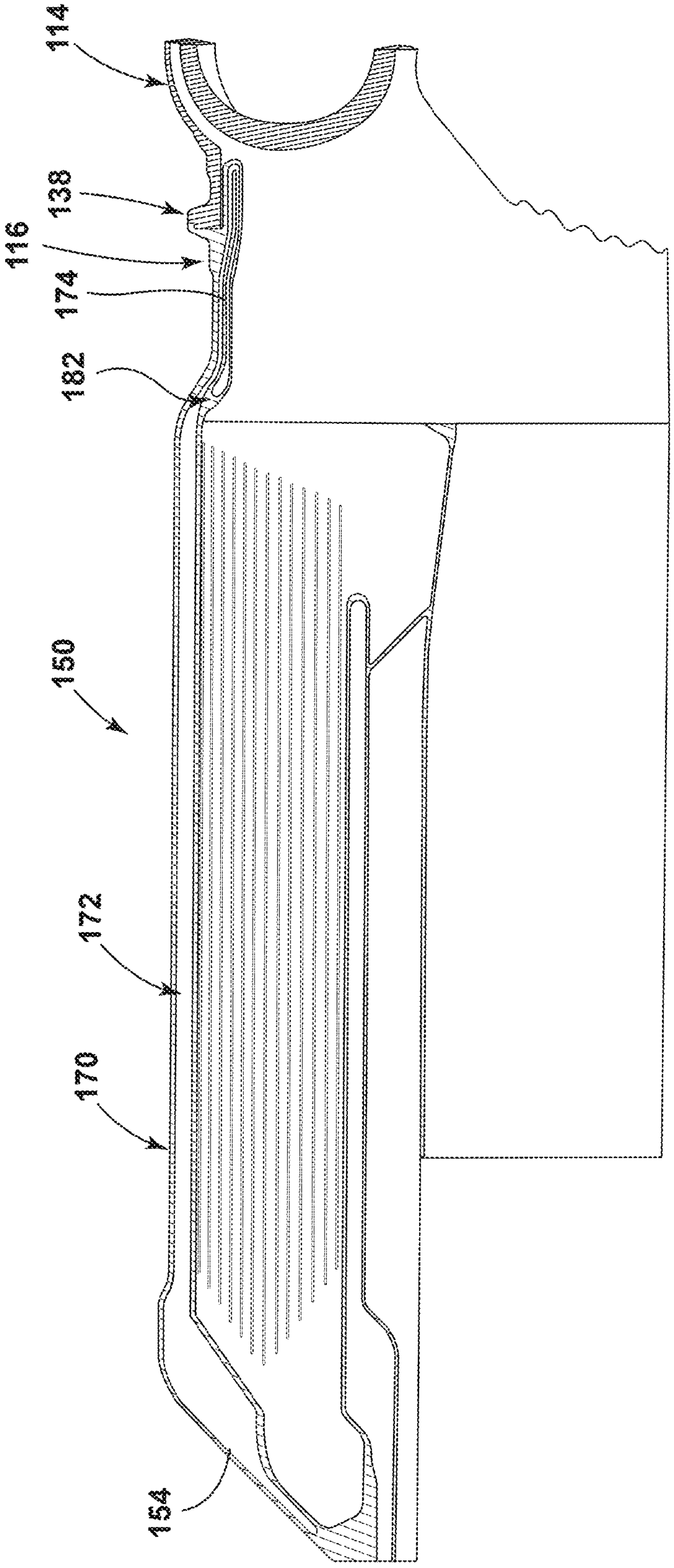
FIG. 11 illustrates a side perspective view of a recuperator in accordance with aspects of the present subject matter.

With further reference to FIGS. 11, in some cases, the bypass channel 172 and/or the guide 174 may extend laterally inward (i.e., further towards the interior section 134 of the closed-cycle engine 102 than the coupling section 138 of the housing 116, which may couple the housing 116 with the engine body 114. As provided herein, the bypass portion 170 may allow for a temperature of the housing 116 to be maintained below a thermal threshold. By maintaining the housing 116 below the thermal threshold, the coupling section of the housing 116 may be at least partially prevented from thermal degradation. Additionally or alternatively, the bypass portion 170 may provide for insulative properties that maintain a defined heat range within various regions of the engine 102.

Figure 12:
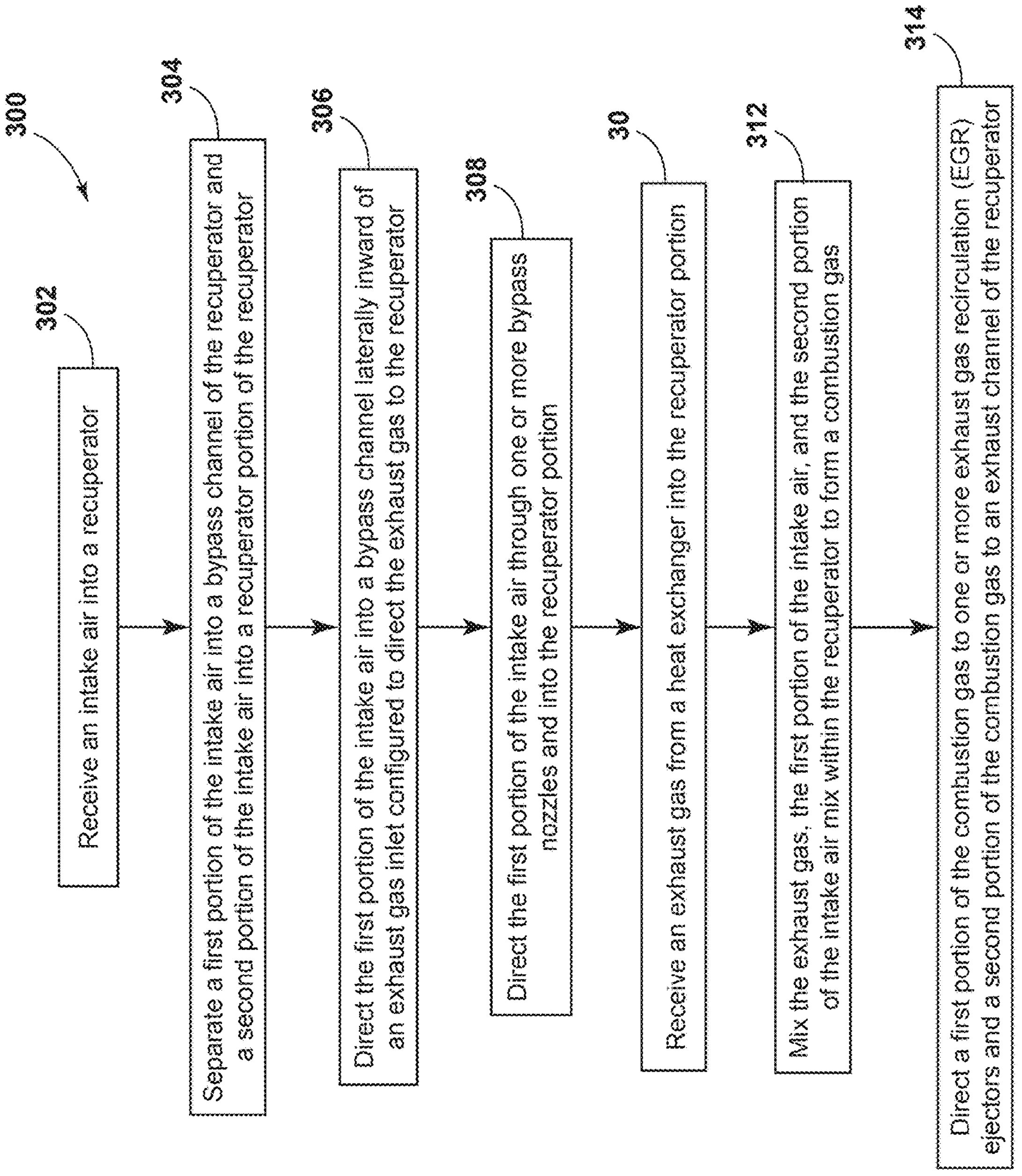
FIG. 12 is a flow diagram of a method for operating a closed-cycle engine in accordance with aspects of the present subject matter Repeat use of reference characters in the present specification and drawings is intended to represent the same or analogous features or elements of the present technology.

Referring now to FIG. 12, a flow diagram of an embodiment of a method 300 of operating a closed-cycle engine is illustrated. In general, the method 300 will be described herein with reference to the closed-cycle engine 102 illustrated in FIGS. 1-11. However, it should be appreciated that the disclosed method 300 may be implemented with any engine having any other suitable configurations. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein may be omitted, rearranged, combined, and/or adapted in numerous ways without deviating from the scope of the present disclosure.

As illustrated, at (302), the method 300 may include receiving an intake fluid into a recuperator. As provided herein, the intake fluid may be ambient air that is received through an intake fluid channel. In some cases, the method may include pressurizing the intake fluid, such as via a compressor, to induce a flow of intake fluid into the intake fluid pathway.

At (304), the method 300 may include separating a first portion of the intake fluid into a bypass channel of the recuperator and a second portion of the intake fluid into a recuperator portion of the recuperator. In some cases, a first volume of the first portion of the intake fluid is less than a second volume of the second portion of the intake fluid.

At (306), the method 300 may include directing the first portion of the intake fluid into a bypass channel laterally inward of an exhaust gas inlet configured to direct the exhaust gas to the recuperator. In addition, at (308), the method 300 may include directing the first portion of the intake fluid through one or more bypass nozzles and into the recuperator portion.

At (310), the method 300 may include receiving an exhaust gas from a heat exchanger into the recuperator portion. In turn, at (312), the method 300 may include mixing the exhaust gas, the first portion of the intake fluid, and the second portion of the intake fluid mix within the recuperator to form a combustion gas.

At (314), the method 300 may include directing a first portion of the combustion gas to an exhaust gas recirculation (EGR) ejector and a second portion of the combustion gas to a discharge channel of the recuperator.

Further aspects are provided by the subject matter of the following clauses:

A closed-cycle engine comprising: a heat exchanger channel fluidly coupled with a heat exchanger and configured to receive an exhaust gas from the heat exchanger; an intake channel configured to receive intake fluid therethrough; and a recuperator operably coupled with the heat exchanger channel and the intake channel, the recuperator including: a bypass channel; a recuperator portion fluidly separated from the bypass channel; and a separator configured to direct a first portion of the intake fluid into the bypass channel and a second portion of the intake fluid into the recuperator portion, wherein the exhaust gas, the first portion of the intake fluid, and the second portion of the intake fluid mix within the recuperator to form a combustion gas.

The closed-cycle engine of one or more of these clauses, wherein the heat exchanger is configured to receive the exhaust gas from an expansion chamber.

The closed-cycle engine of one or more of these clauses, wherein the recuperator further includes: a guide configured to alter a direction of flow of the first portion of the intake fluid from a first direction to a generally opposing second direction.

The closed-cycle engine of one or more of these clauses, wherein the guide extends laterally inward of an exhaust gas recirculation (EGR) ejector.

The closed-cycle engine of one or more of these clauses, wherein a first portion of the combustion gas is directed to an exhaust gas recirculation (EGR) ejector and a second portion of the combustion gas is directed to a discharge channel.

The closed-cycle engine of one or more of these clauses, wherein the bypass channel defines a bypass outlet, and wherein the bypass outlet includes one or more bypass nozzles upstream of the EGR ejector.

The closed-cycle engine of one or more of these clauses, wherein the bypass channel extends laterally inward of the EGR ejector, and wherein a temperature of the first portion of the intake fluid within the bypass channel is less than a temperature of the combustion gas exhausted from the EGR ejector.

The closed-cycle engine of one or more of these clauses, wherein the bypass channel is positioned radially outward of the EGR ejector, and wherein a temperature of the first portion of the intake fluid within the bypass channel is less than a temperature of the combustion gas exhausted from the EGR ejector.

The closed-cycle engine of one or more of these clauses, wherein the bypass channel includes: a first segment having a varied radial thickness relative to an axis; a second segment downstream of the first segment and having a second segment radial thickness; a third segment downstream of the second segment and having a third segment radial thickness that is less than the second segment radial thickness; a fourth segment downstream of the third segment, wherein a direction of the first portion of the intake fluid within the fourth segment is at least partially opposite to the direction of the first portion of the intake fluid within the third segment; and a fifth segment downstream of the fourth segment and having at least a portion with a fifth segment radial thickness that is greater than a fourth segment radial thickness.

The closed-cycle engine of one or more of these clauses, wherein an outboard temperature of a laterally outboard section of the recuperator is within 25 times an inboard temperature of a laterally inboard section of the recuperator.

A method for operating a closed-cycle engine, the method including: receiving an intake fluid into a recuperator; separating a first portion of the intake fluid into a bypass channel of the recuperator and a second portion of the intake fluid into a recuperator portion of the recuperator; receiving an exhaust gas from a heat exchanger into the recuperator portion; and mixing the exhaust gas, the first portion of the intake fluid, and the second portion of the intake fluid mix within the recuperator to form a combustion gas.

The method of one or more of these clauses, wherein a first volume of the first portion of intake fluid is less than a second volume of the second portion of intake fluid.

The method of one or more of these clauses, further comprising: directing the first portion of the intake fluid into a bypass channel laterally inward of an exhaust gas inlet configured to direct the exhaust gas to the recuperator.

The method of one or more of these clauses, further comprising: directing the first portion of the intake fluid through one or more bypass nozzles and into the recuperator portion.

The method of one or more of these clauses, further comprising: directing a first portion of the combustion gas to an exhaust gas recirculation (EGR) ejector and a second portion of the combustion gas to a discharge channel of the recuperator.

The recuperator for a closed-cycle engine of one or more of these clauses, the recuperator comprising: a bypass channel; a recuperator portion fluidly separated from the bypass channel; and a separator configured to direct a first portion of an intake fluid into the bypass channel and a second portion of the intake fluid into the recuperator portion, wherein the exhaust gas, the first portion of the intake fluid, and the second portion of the intake fluid mix within the recuperator to form a combustion gas.

The recuperator for a closed-cycle engine of one or more of these clauses, further comprising: a guide configured to alter a direction of flow of the first portion of the intake fluid from a first direction to a generally opposing second direction, wherein a guide extends laterally inward of an exhaust gas recirculation (EGR) ejector.

The recuperator for a closed-cycle engine of one or more of these clauses, wherein a first portion of the combustion gas is directed to an exhaust gas recirculation (EGR) ejector and a second portion of the combustion gas is directed to a discharge channel.

The recuperator for a closed-cycle engine of one or more of these clauses, wherein the bypass channel defines a bypass outlet, and wherein the bypass outlet includes one or more bypass nozzles upstream of the EGR ejector.

The recuperator for a closed-cycle engine of one or more of these clauses, wherein the bypass channel extends laterally inward of the EGR ejector, and wherein a temperature of the intake fluid within the bypass channel is less than a temperature of the combustion gas exhausted from the EGR ejector.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A closed-cycle engine comprising:

- a heat exchanger channel fluidly coupled with a heat exchanger and configured to receive an exhaust gas from the heat exchanger;
- an intake channel configured to receive intake fluid therethrough; and
- a recuperator operably coupled with the heat exchanger channel and the intake channel, the recuperator comprising:
  - a bypass channel;
  - a recuperator portion fluidly separated from the bypass channel; and
  - a separator configured to direct a first portion of the intake fluid into the bypass channel and a second portion of the intake fluid into the recuperator portion,
- wherein the exhaust gas, the first portion of the intake fluid, and the second portion of the intake fluid mix within the recuperator to form a combustion gas.

2. The closed-cycle engine of claim 1, wherein the heat exchanger is configured to receive the exhaust gas from an expansion chamber.

3. The closed-cycle engine of claim 2, wherein the recuperator further comprises:

- a guide configured to alter a direction of flow of the first portion of the intake fluid from a first direction to a generally opposing second direction.

4. The closed-cycle engine of claim 3, wherein the guide extends laterally inward of an exhaust gas recirculation (EGR) ejector.

5. The closed-cycle engine of claim 2, wherein a first portion of the combustion gas is directed to an exhaust gas recirculation (EGR) ejector and a second portion of the combustion gas is directed to a discharge channel.

6. The closed-cycle engine of claim 5, wherein the bypass channel defines a bypass outlet, and wherein the bypass outlet includes one or more bypass nozzles upstream of the EGR ejector.

7. The closed-cycle engine of claim 5, wherein the bypass channel extends laterally inward of the EGR ejector, and wherein a temperature of the first portion of the intake fluid within the bypass channel is less than a temperature of the combustion gas exhausted from the EGR ejector.

8. The closed-cycle engine of claim 5, wherein the bypass channel is positioned radially outward of the EGR ejector, and wherein a temperature of the first portion of the intake fluid within the bypass channel is less than a temperature of the combustion gas exhausted from the EGR ejector.

9. The closed-cycle engine of claim 1, wherein the bypass channel comprises:

- a first segment having a varied radial thickness relative to an axis;
- a second segment downstream of the first segment and having a second segment radial thickness;
- a third segment downstream of the second segment and having a third segment radial thickness that is less than the second segment radial thickness;
- a fourth segment downstream of the third segment, wherein a direction of the first portion of the intake fluid within the fourth segment is at least partially opposite to the direction of the first portion of the intake fluid within the third segment; and
- a fifth segment downstream of the fourth segment and having at least a portion with a fifth segment radial thickness that is greater than a fourth segment radial thickness.

10. The closed-cycle engine of claim 1, wherein an outboard temperature of a laterally outboard section of the recuperator is within 25 times an inboard temperature of a laterally inboard section of the recuperator.

11. A method for operating a closed-cycle engine, the method comprising:

- receiving an intake fluid into a recuperator;
- separating a first portion of the intake fluid into a bypass channel of the recuperator and a second portion of the intake fluid into a recuperator portion of the recuperator;
- receiving an exhaust gas from a heat exchanger into the recuperator portion; and
- mixing the exhaust gas, the first portion of the intake fluid, and the second portion of the intake fluid mix within the recuperator to form a combustion gas.

12. The method of claim 11, wherein a first volume of the first portion of intake fluid is less than a second volume of the second portion of intake fluid.

13. The method of claim 12, further comprising:

- directing the first portion of the intake fluid into a bypass channel laterally inward of an exhaust gas inlet configured to direct the exhaust gas to the recuperator.

14. The method of claim 13, further comprising:

- directing the first portion of the intake fluid through one or more bypass nozzles and into the recuperator portion.

15. The method of claim 13, further comprising:

directing a first portion of the combustion gas to an exhaust gas recirculation (EGR) ejector and a second portion of the combustion gas to a discharge channel of the recuperator.

16. A recuperator for a closed-cycle engine, the recuperator comprising:

a bypass channel;

a recuperator portion fluidly separated from the bypass channel; and a separator configured to direct a first portion of an intake fluid into the bypass channel and a second portion of the intake fluid into the recuperator portion, wherein the exhaust gas, the first portion of the intake fluid, and the second portion of the intake fluid mix within the recuperator to form a combustion gas.

17. The recuperator for a closed-cycle engine of claim 16, further comprising:

a guide configured to alter a direction of flow of the first portion of the intake fluid from a first direction to a generally opposing second direction, wherein a guide extends laterally inward of an exhaust gas recirculation (EGR) ejector.

18. The recuperator for a closed-cycle engine of claim 16, wherein a first portion of the combustion gas is directed to an exhaust gas recirculation (EGR) ejector and a second portion of the combustion gas is directed to a discharge channel.

19. The recuperator for a closed-cycle engine of claim 18, wherein the bypass channel defines a bypass outlet, and wherein the bypass outlet includes one or more bypass nozzles upstream of the EGR ejector.

20. The recuperator for a closed-cycle engine of claim 18, wherein the bypass channel extends laterally inward of the EGR ejector, and wherein a temperature of the intake fluid within the bypass channel is less than a temperature of the combustion gas exhausted from the EGR ejector.

* * * * *